No. 879,108. PATENTED FEB. 11, 1908.
B. A. KING.
GEARING.
APPLICATION FILED MAY 21, 1907.

2 SHEETS—SHEET 1.

WITNESSES:
G. R. Thomas
M. T. Miller.

INVENTOR
Bernard A. King
BY Chandler & Chandler
Attorneys

No. 879,108. PATENTED FEB. 11, 1908.
B. A. KING.
GEARING.
APPLICATION FILED MAY 21, 1907.

2 SHEETS—SHEET 2.

WITNESSES:
G. R. Thomas
M. F. Miller.

INVENTOR
Bernard A. King
BY Chandler & Chandler
Attorneys

UNITED STATES PATENT OFFICE.

BERNARD A. KING, OF BIRMINGHAM, ALABAMA, ASSIGNOR TO WILLIAM E. DAVIS, OF BIRMINGHAM, ALABAMA.

GEARING.

No. 879,108.     Specification of Letters Patent.     Patented Feb. 11, 1908.

Application filed May 21, 1907. Serial No. 374,811.

*To all whom it may concern:*

Be it known that I, BERNARD A. KING, a citizen of the United States, residing at Birmingham, in the county of Jefferson, State of Alabama, have invented certain new and useful Improvements in Gearing; and I do hereby declare the following to be a full, clear, and exact description of the invention, such as will enable others skilled in the art to which it appertains to make and use the same.

This invention relates to new and useful improvements in gearing and it has more particular reference to a gearing for hoisting machines and adapted for use in connection with a two cage freight elevator, the object being to provide a novel construction, combination and arrangement of parts, whereby one element is utilized in the three functions of a friction gear, brake wheel, and sheave.

The details of construction will appear in the course of the following description, in which reference is had to the accompanying drawings forming a part of this specification, like characters of reference designating similar parts throughout the several views, wherein:—

Figure 1:
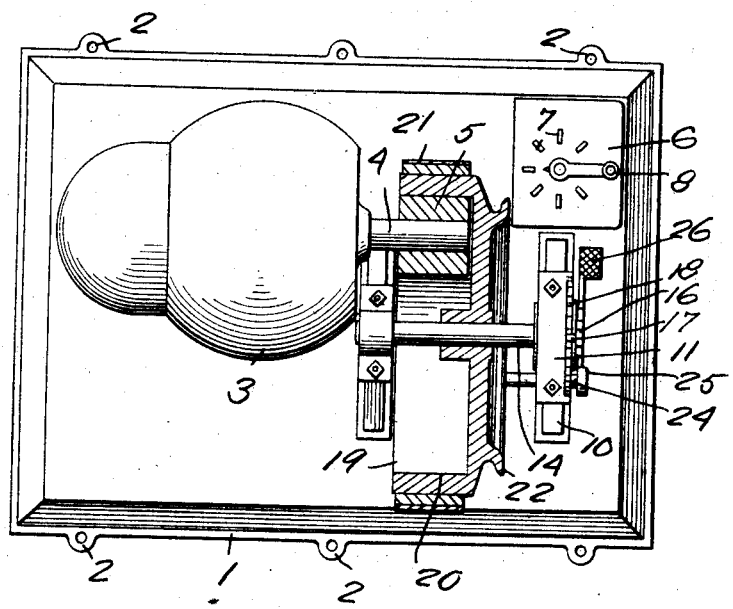
Figure 2:
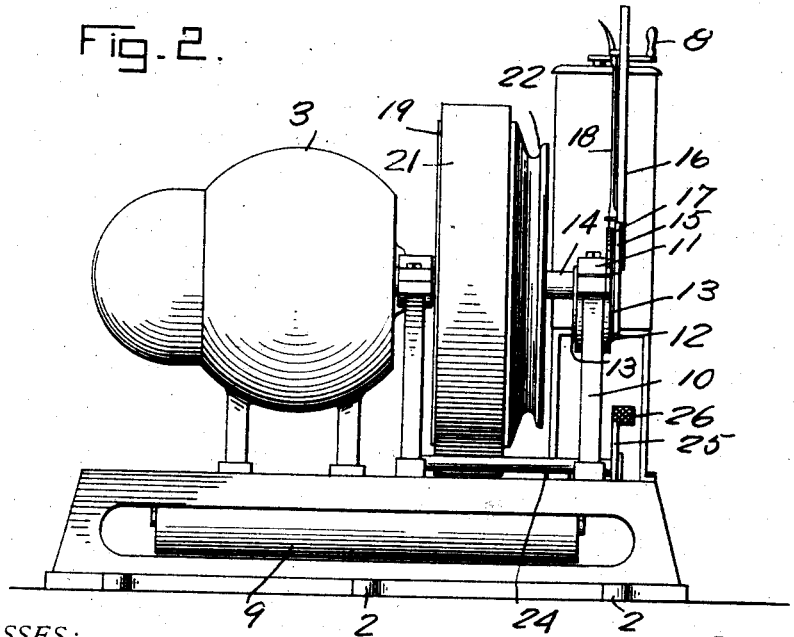
Figure 3:
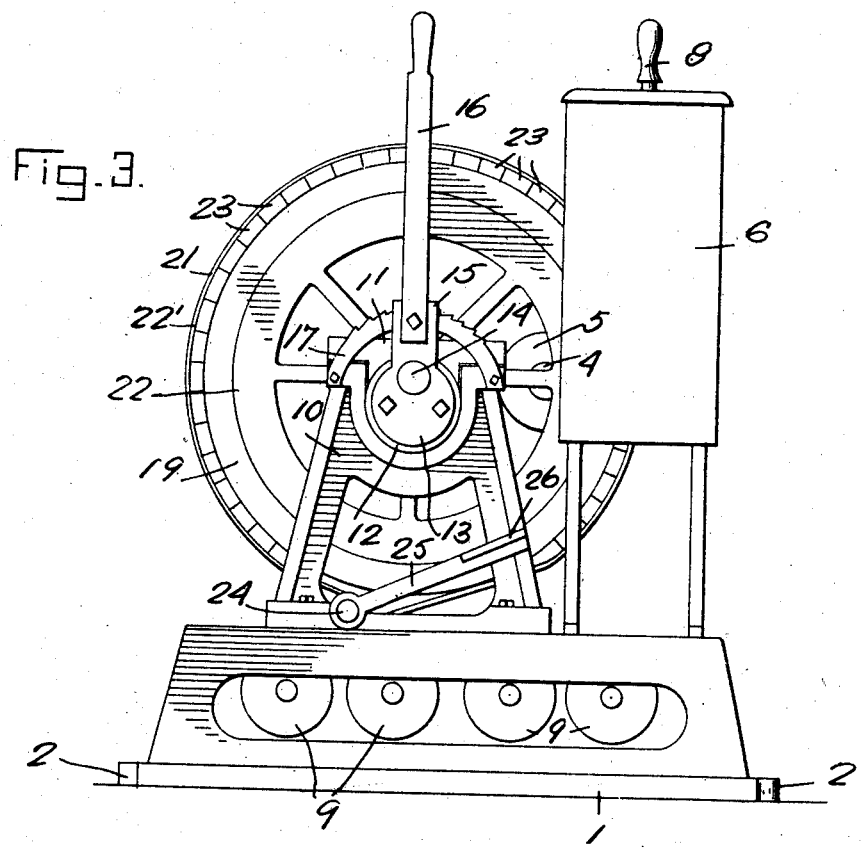

Figure 1 is a top plan view partly in section of a transmission gearing constructed in accordance with the present invention. Fig. 2 is an end elevation thereof. Fig. 3 is a side elevation thereof.

Referring specifically to the accompanying drawings, the numeral 1 designates a base formed along its lower edge with apertured ears 2 by means of which the base may be secured to a suitable bed or foundation. Mounted upon the base 1 is an electric motor 3 having a power shaft 4 which carries a friction wheel 5. At one side of said base is a controller 6 provided with the usual suitably designated indicating lugs 7 and the handle 8, and beneath the base are provided the coils 9 of the rheostat which forms a part of said controller. Upon the base 1 are provided bracket bearings 10 which include removable bearing plates 11, which are equipped with annular bushings 12. Journaled in said bushings are disks 13 and journaled in said disks eccentrically thereof is a shaft 14. One of the disks 13 is provided with an upwardly extending fast arm 15 to which is secured a lever 16, the latter working about a rack quadrant 17 secured to the adjacent bracket bearing 10 and being provided with a trigger operated pawl 18 for engagement with the teeth of said rack quadrant.

The shaft 14 carries between the bracket bearings 10 a wheel 19 having a dished face 20 formed for frictional engagement with the wheel 5. The periphery of the wheel 19 is formed for frictional engagement with a brake band 21, and the said wheel at one side thereof is formed with an integral sheave 22 over which the cable for operating the elevator cages is trained. The brake band 21 is constructed of a flexible metallic body 22' to the inner surface of which are secured transverse wooden slats 23 which afford a frictional braking surface for action on the periphery of the wheel 19.

The ends of the band 23 are connected in any suitable manner known to the art with a rock shaft 24, which, upon proper movement actuates said band to release or grip the wheel 19. The shaft 24 carries a fast foot lever 25 formed at its outer end with a pedal 26.

In use, the apparatus is thrown in or out of gear by rocking the lever 16. In this action the disks 13 correspondingly move the shaft 14 and the wheel 19 to engage or disengage the wheel 5 of the power shaft 4. In addition to this action when the motor is off the band brake 21 may be applied by the operation of the shaft 25 through the means described and the flexible nature of said band brake will cause the same to disengage the wheel 19 when the lever 25 is released.

A gearing constructed in accordance with the present invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. The combination with a driving shaft, and a friction wheel carried by said driving shaft, of bracket bearings, disks journaled therein, a lever carried by one of said disks, a shaft journaled eccentrically in said disks, a wheel on said shaft having a dished face for engagement with said friction wheel, said last-named wheel being constructed with a sheave at one side thereof, a band brake for engagement with the periphery of said wheel and means for operating said band brake.

2. The combination with a driving shaft and a friction wheel carried by said driving shaft, of bracket bearings, disks journaled therein, a lever carried by one of said disks, a shaft journaled eccentrically in said disks and a wheel on said shaft having its face dished to afford an inner peripheral surface for engagement with said friction wheel.

In testimony whereof, I affix my signature, in presence of two witnesses.

BERNARD A. KING.

Witnesses:
   JOHN F. WILLIAMS,
   A. F. COLLER.